US012810242B2

(12) United States Patent
Vandeputte

(10) Patent No.: US 12,810,242 B2
(45) Date of Patent: Nov. 24, 2026

(54) METHOD AND DEVICE FOR SORTING, VALUATION AND LABELING OF PRODUCTS PROVIDED WITH AN IDENTIFICATION CODE, SUCH AS BOOKS, AND DIGITAL MEDIA SUCH AS CD, DVD AND VHS CASSETTES

(71) Applicant: VALVAN NV, Menen (BE)

(72) Inventor: Maurits Vandeputte, Menen (BE)

( * ) Notice: Subject to any disclaimer, the term of this patent is extended or adjusted under 35 U.S.C. 154(b) by 52 days.

(21) Appl. No.: 18/614,231

(22) Filed: Mar. 22, 2024

(65) Prior Publication Data

US 2024/0338655 A1 Oct. 10, 2024

(30) Foreign Application Priority Data

Apr. 7, 2023 (BE) .................................. 2023/5267

(51) Int. Cl.

*G06Q 30/0283* (2023.01)
*G06K 7/14* (2006.01)
*G06Q 10/087* (2023.01)

(52) U.S. Cl.

CPC ......... *G06Q 10/087* (2013.01); *G06K 7/1413* (2013.01); *G06K 7/1417* (2013.01); *G06Q 30/0283* (2013.01)

(58) Field of Classification Search

CPC .. G06Q 10/087; G06Q 30/0283; G06Q 10/30; G06Q 30/02; G06K 7/1413; G06K 7/1417

See application file for complete search history.

(56) References Cited

U.S. PATENT DOCUMENTS

| | | | | | |
|---|---|---|---|---|---|
| 4,959,530 | A * | 9/1990 | O'Connor | .............. | G06K 17/00 177/1 |
| 6,491,217 | B2 * | 12/2002 | Catan | ...................... | G06F 16/38 707/E17.112 |
| 8,489,464 | B1 * | 7/2013 | Parihar | .................. | G06Q 30/02 705/26.1 |

(Continued)

FOREIGN PATENT DOCUMENTS

| | | | |
|---|---|---|---|
| CN | 203265073 U | * | 11/2013 |
| CN | 204576687 U | * | 8/2015 |

(Continued)

OTHER PUBLICATIONS

Tech Talk—the use of AI for sorting second hand books; www.youtube.com/watch?v=mqvCstcFGZA; Mar. 23, 2023.

*Primary Examiner* — Ashford S Hayles
(74) *Attorney, Agent, or Firm* — Vorys, Sater, Seymour and Pease, LLP; Iona N. Kaiser

(57) ABSTRACT

A method for sorting, valuation and labeling products provided with an identification code, comprising the steps of supplying products; scanning the identification code of the products using a first visual system; identifying the products based on the scanned identification code; applying a label to the product; sorting the products into categories; wherein when identifying the products on the basis of the scanned identification code, digital product data is retrieved, wherein the digital product data includes at least a publication date and additionally a list price and/or a sale price according to at least one online store, and where a sale price is automatically determined based on the digital product data, which is printed on the label.

7 Claims, 2 Drawing Sheets

(56) References Cited

U.S. PATENT DOCUMENTS 8,799,101 B1* 8/2014 Brazil ..................... G06Q 30/00 705/26.1
12,232,610 B1* 2/2025 Wilkinson ........... A47B 83/001
2004/0054627 A1* 3/2004 Rutledge .............. G06Q 10/087 705/50
2004/0098318 A1* 5/2004 Furukawa .............. G06Q 30/02 705/26.1
2004/0117319 A1* 6/2004 Oshima ................ G06Q 20/401 705/75
2004/0138966 A1* 7/2004 Kopelman ......... G06Q 30/0623 705/26.1
2006/0029911 A1* 2/2006 Monk ..................... G09B 19/18 434/107
2007/0021877 A1* 1/2007 McDonough .......... G06Q 10/08 701/1
2008/0077542 A1* 3/2008 McElhiney ............ G06Q 30/06 705/400
2008/0133305 A1* 6/2008 Yates ...................... G06Q 30/08 705/26.1
2008/0154761 A1* 6/2008 Flake ...................... G06Q 30/02 705/37
2010/0138304 A1* 6/2010 Boyarsky ........... G06Q 30/0281 345/173
2011/0245965 A1* 10/2011 Farrell ................... G06Q 20/20 705/26.1
2013/0141222 A1* 6/2013 Garcia ............... G06K 7/10039 340/10.51
2014/0156554 A1* 6/2014 Payne, IV .......... G06Q 30/0282 705/347
2014/0333761 A1* 11/2014 Porter .................... G06Q 30/06 348/135
2015/0081090 A1* 3/2015 Dong ........................ B07C 5/00 700/230
2018/0189751 A1* 7/2018 Jones ...................... G06Q 10/30
2018/0224837 A1* 8/2018 Enssle ................ G06Q 10/0875
2020/0051018 A1* 2/2020 Shamiss ............. G06Q 10/0837
2020/0184519 A1* 6/2020 Grundy .............. G06Q 30/0278
2020/0380529 A1* 12/2020 Maina ................... G06F 3/0482
2022/0036371 A1* 2/2022 Frisbee ................ G06Q 30/018
2023/0244710 A1* 8/2023 Wold ....................... G06F 16/65 707/736
2024/0095650 A1* 3/2024 Taylor ................ G06K 7/10297

FOREIGN PATENT DOCUMENTS

CN 106022893 A * 10/2016 ......... G06Q 30/0601
CN 106779912 A * 5/2017 ......... G06Q 30/0601
CN 107506933 A * 12/2017 ......... G06K 17/0022
CN 209522147 U * 10/2019
CN 213070001 U * 4/2021
GB 2396859 A * 7/2004 ......... G06Q 10/0877
GB 2620723 A * 1/2024 ........... G06T 7/0002
KR 20130047930 A * 5/2013 ............. G06Q 50/26
KR 101523533 B1 * 5/2015
KR 20210116975 A * 9/2021 ........... G06Q 10/087
KR 102441525 B1 * 9/2022 ............... B07C 3/12
KR 102445085 B1 * 9/2022 ......... G06Q 30/0206
TW I420411 B * 12/2013
WO WO-9213769 A1 * 8/1992 ............... B65C 9/46
WO WO-0103047 A1 * 1/2001 ............. G06Q 30/06
WO WO-2004004930 A1 * 1/2004
WO WO-2020084544 A1 * 4/2020 ............... B65C 9/46
WO WO-2021030635 A1 * 2/2021 ......... G06Q 30/0278

* cited by examiner

METHOD AND DEVICE FOR SORTING, VALUATION AND LABELING OF PRODUCTS PROVIDED WITH AN IDENTIFICATION CODE, SUCH AS BOOKS, AND DIGITAL MEDIA SUCH AS CD, DVD AND VHS CASSETTES

TECHNICAL FIELD

The invention relates to a method and a device for sorting, valuation and labeling of products, more in particular products provided with an identification code, such as books and digital media.

BACKGROUND

Systems for automatic product sorting are known from the prior art.

An example of such a system is disclosed in U.S. Pat. No. 10,835,928. US '928 describes a conveyor system for sorting products. The conveyor system includes an identification module for identifying products and a plurality of sorting modules for moving and sorting products. The sorting modules comprise roller sets for moving the products to sorting destinations. The system is modular and can be expanded with additional sorting modules. US '928 also describes a corresponding method. A conveyor system according to US '928 is suitable for sorting and transporting incoming products in a retail facility or distribution center.

This known system is not suitable for sorting second-hand products. The conveyor system from US '928 assumes that every product is known and that every product is in an equal and good condition. When sorting, it is not taken into account that a product may already have been used or has a certain age and is therefore less or more valuable. When identifying products, only products that are currently included as new products in the range of a retail facility or distribution center need to be taken into account, and not products that may not have been sold for several years.

The present invention aims to solve at least some of the above-mentioned problems or drawbacks.

SUMMARY OF THE INVENTION

In a first aspect, the present invention relates to a method for sorting, valuation and labeling of products provided with an identification code, comprising the following steps of: supplying products; scanning the identification code of the products using a first visual system; identifying the products based on the scanned identification code; applying a label to the product; sorting the products into categories; characterized in that when identifying the products on the basis of the scanned identification code, digital product data is retrieved, wherein the digital product data includes at least a publication date and additionally a list price and/or a sale price according to at least one online store, and in that based on the digital product data a sale price is automatically determined for each individual product, which is printed on the label.

The advantage of this method is that it also allows second-hand products to be sorted. After identifying the products based on an identification code, digital product data including at least a publication date, a list price and/or a sale price according to at least one online store is searched for. This digital product data is searchable in databases or online, which means that not only products from a current or former product range of a retail facility or a distribution center can be sorted. An additional advantage of the method is that a sale price is automatically determined based on the digital product data, which is printed on the label, where, for example, the age of a product is taken into account and a fixed sale price is not assumed.

A specific preferred form of the invention relates to a method wherein when determining the sale price, a condition of the product is taken into account, wherein the condition of the product is determined by comparing the automatically determined dimensions of the product with dimensions included in the digital product data.

This embodiment is advantageous because the sale price is now determined not only on the basis of, for example, the age of a product, but also on whether the product has been used often and is therefore in less good condition, for example because a book curls up and therefore has larger dimensions than the original book.

In a second aspect, the present invention relates to a device wherein a position on the product for applying the label is automatically determined with the aid of a visual system. This device has the advantage, among other things, that it is suitable for automatically scanning the identification code of a product and looking up digital product data of the product. This makes the device suitable for sorting second-hand products that do not belong to a current or former product range of a retail facility or a distribution center and for example to process these products differently based on age, for example by determining a different sale price based on age.

Use of the described method and/or device for sorting, valuation and labeling of second-hand books and digital media results in advantageous sorting, valuation and labeling of second-hand books and digital media. Second-hand books and digital media are automatically identified and based on digital product data, a sale price for the second-hand book or digital medium is automatically determined, which is automatically applied to a label on the second-hand book or digital medium. This means that products that are no longer sold new and that are not all in the same condition can be processed automatically.

DETAILED DESCRIPTION

Figure 1:
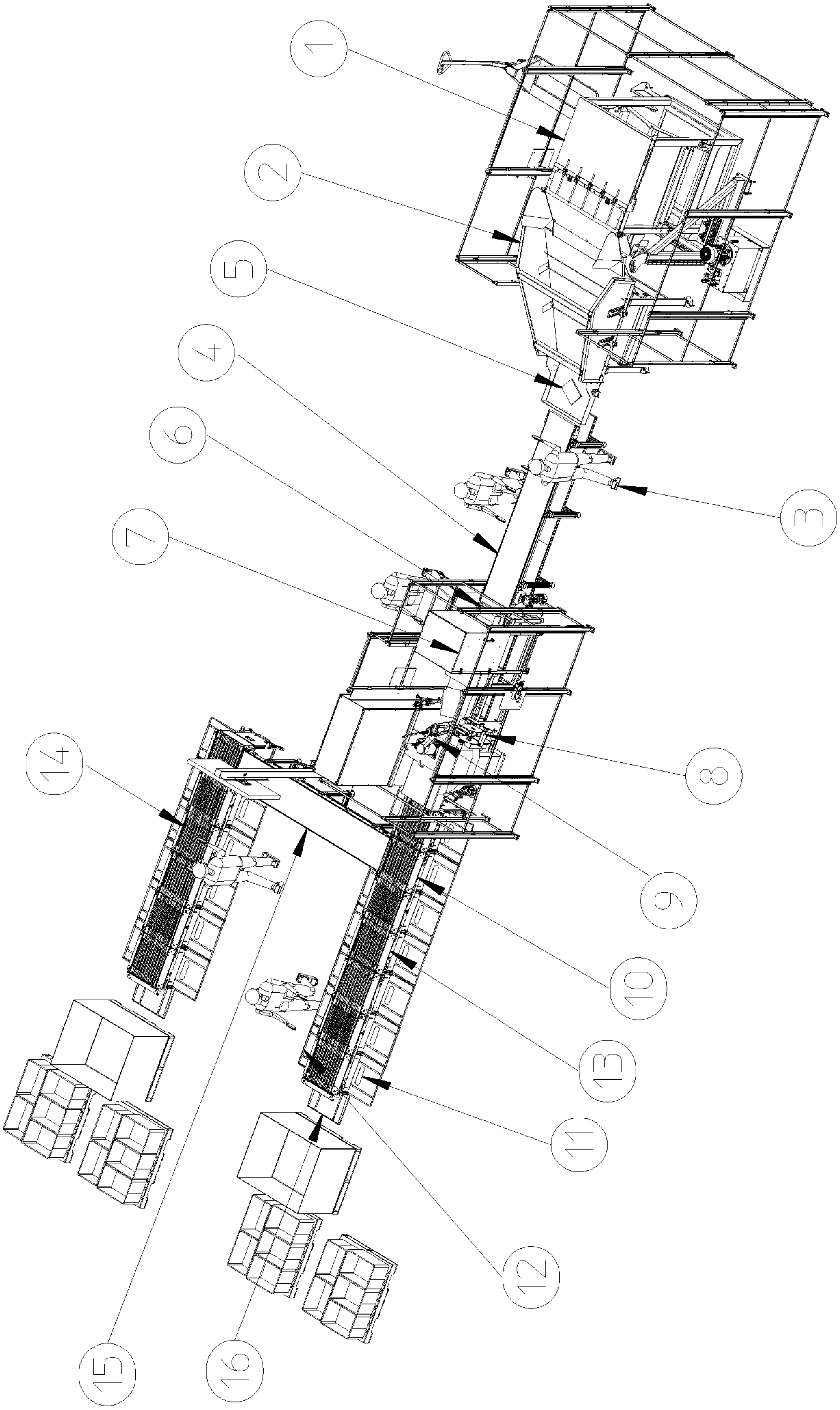
FIG. 1 shows a perspective view of a device according to an embodiment of the present invention.

Unless otherwise defined, all terms used in the description of the invention, including technical and scientific terms, have the meanings as commonly understood by a person skilled in the art to which the invention pertains. For a better understanding of the description of the invention, the following terms are explained explicitly.

In this document, "a" and "the" refer to both the singular and the plural, unless the context presupposes otherwise. For example, "a segment" means one or more segments.

The terms "comprise," "comprising," "consist of," "consisting of," "provided with," "include," "including," "contain," "containing," are synonyms and are inclusive or open terms that indicate the presence of what follows, and which do not exclude or prevent the presence of other components, characteristics, elements, members, steps, as known from or disclosed in the prior art.

Quoting numeric intervals by the endpoints includes all integers, fractions, and/or real numbers between the endpoints, including those endpoints.

In the context of this document, the abbreviation ISBN means International Standard Book Number, the abbreviation UPC Universal Product Code, the abbreviation GTIN Global Trade Item Number, the abbreviation EAN European Article numbering and the abbreviation OCR Optical Character Recognition.

In a first aspect, the invention concerns a method for sorting, valuation and labeling products provided with an identification code.

According to a preferred embodiment, the method comprises the steps of supplying products, scanning the identification code of the products using a first visual system, identifying the products, determining a sale price for each individual product, applying a label to the product and sorting the products into categories.

The products include an identification code, such as an ISBN code, a UPC code, a GTIN code or an EAN code. The products are preferably books or digital media such as CDs or DVDs. Preferably, the identification code is also printed as numbers on the product.

The products are preferably supplied automatically on a supply line. The supply line includes at least one transport surface for supplying the products according to a feed direction. The at least one transport surface is formed by a conveyor belt, roller conveyor or other suitable means for supplying the products. The supply line comprises a drive means for driving the at least one transport surface.

The products are manually applied by an operator to at least one transport surface of the supply line. Alternatively, the products are automatically arranged on the supply line. The products are arranged on the supply line with the identification code visible. The identification code is preferably visible from a viewing direction transverse to the at least one transport surface.

The products are preferably arranged on the supply line with a fixed orientation. The products are, for example, books. The books comprise a spine side. The books are then preferably placed on the supply line with the spine side transverse to the feed direction of the supply line, with the spine side facing the first visual system. Such a fixed orientation is advantageous for scanning the identification code of the product using the first visual system, because the identification code will always be oriented according to one of two orthogonal directions, namely parallel to the feed direction or transverse to the feed direction.

The products are preferably supplied with an intermediate distance between successive products. This is advantageous for scanning the product identification code using the first visual system, because it avoids the risk of a scanned identification code being assigned to the wrong product, for example because two products are against or on top of each other, and which would result in a label being placed on the wrong product. The intermediate distance is preferably at least 5 cm, more preferably at least 10 cm and even more preferably at least 15 cm.

The products are fed by the supply line to the first visual system. The first visual system is mounted above the supply line. Alternatively, the first visual system is mounted above a second line and the products are transferred from the supply line to the second line. The first visual system includes a scanner for scanning barcodes or two-dimensional QR codes. The scanner is preferably a line scan camera. The barcodes or two-dimensional QR codes are a representation of the said identification code. Preferably, the first visual system is also suitable for scanning characters, so that if the identification code cannot be scanned as a barcode or as a two-dimensional QR code, the printed digits of the identification code are scanned and recognized using an OCR program.

The products are identified based on the scanned identification code. In this context, identifying means that the scanned identification code is associated with the scanned product. For example, the scanned ISBN code is associated with a scanned book. Preferably, the identification of a product is done automatically. When identifying the products, digital product data of a product with the same identification code is searched for based on the scanned identification code. The digital product data includes at least a publication date. The publication date is the date on which a product such as a book or a digital medium, such as a CD or DVD, was published. The digital product data also includes a list price and/or a sale price according to at least one online store. The list price is the price of a new product. The sale price according to at least one online store is the price asked for the product on a website of the at least one online store, such as Amazon, bol.com, etc. The sale price according to the at least one online store can be either the price of a new product or the price of a second-hand product.

A sale price for each individual product is automatically determined based on the digital product data. Each individual product refers to a product that has been scanned and identified. For example, the sale price is equal to the list price or the sale price according to at least one online store, possibly minus a percentage discount, proportional to the age of the product. The age of the product can be determined based on the publication date. For example, the sale price is equal to the sale price according to the at least one online store for a second-hand product with the same publication date or a weighted average of the sale prices of multiple online stores for a second-hand product with the same publication date. It will be apparent that different formulas for determining the sale price are possible. It is also clear that for a product with historical value, for example a second-hand book, CD or DVD with a high collector's value, a sale price can be determined that is higher than the list price of the original new product, because, for example, the sale price according to the at least one online store for a product with a similar publication date is higher than the list price of the original new product.

The automatically determined sale price for the new product is printed on the label using a printer. The label is applied to the product manually or automatically. The label is preferably applied to the product automatically. The label is preferably a self-adhesive label. The label is applied after the first visual system. The label is preferably applied to the product on the supply line or on the second line.

The products are sorted into different categories. Non-limiting examples of categories are the automatically determined sale price, genre of the product in the case of books and digital media, destination of the product, condition of the product, etc. Preferably, the products are sorted automatically. Preferably, the retrieved digital product data is used herein. Preferably, the products are automatically sorted on a sorting line, where the products are automatically transferred from the supply line or from a possible second line to the sorting line after identification using the first visual system. The said label is preferably applied before the sorting line.

This embodiment is advantageous because it also allows second-hand products to be sorted and not only products from a current or former product range of a retail facility or a distribution center. An additional advantage is that a sale price is automatically determined based on the digital product data, which is printed on the label, where, for example, the age of a product is taken into account and a fixed sale price is not assumed.

According to an embodiment, the digital product data of a product is searched for in a local database. The local database comprises identification codes of a plurality of products. The local database comprises for each identification code at least the publication date and also a list price and/or a sale price according to at least one online store. A local database is advantageous for quick searches. A local database is additionally advantageous if no or no stable internet connection is available during the execution of the method, as a result of which online searches are not guaranteed.

According to an embodiment, the digital product data of a product is searched for in an online database. The online database comprises identification codes of a plurality of products. The online database comprises for each identification code at least the publication date and also a list price and/or a sale price according to at least one online store. A non-limiting example of a suitable online database is ISBNdb™ if the product is a book. Similar online databases are available for, for example, CDs and DVDs based on CTIN codes, EAN codes and/or UPC codes. An online database is advantageous because it is constantly updated and supplemented.

According to an embodiment, the digital product data of a product is looked up using an online search engine for identification codes. The identification code is entered into such a search engine and the corresponding digital product data is searched for. A non-limiting example is an online search engine for EAN codes. An online search engine for identification codes is advantageous because it finds recent sale prices from at least one and often several online stores.

According to an embodiment, the digital product data of a product is searched for in a local database and/or an online database and/or an online search engine. This is advantageous to obtain the most complete possible set of digital product data for a product, even if digital product data associated with an identification code is missing in one of the possible sources or if one of the possible sources is temporarily unavailable.

According to an embodiment, the products are supplied on the supply line at a feed rate of at least 10 m/s, preferably at least 11 m/s, more preferably at least 12 m/s, even more preferably at least 13 m/s and even more preferably at least 14 m/s.

At a feed rate of at least 10 m/s it is possible to process at least 1250 products per hour, assuming that a product has a maximum dimension of 500 mm according to the feed direction and there is a distance of 100 mm between two consecutive products. This allows a high throughput of products.

According to a further embodiment, the feed rate is at most 20 m/s, preferably at most 19 m/s, more preferably at most 18 m/s, even more preferably at most 17 m/s and even more preferably at most 16 m/s. At a feed rate of a maximum of 20 m/s it is possible to process a maximum of 2500 products per hour, assuming that a product has a maximum dimension of 500 mm according to the feed direction and there is a distance of 100 mm between two consecutive products. A maximum supply of 2500 products per hour guarantees correct scanning of the identification code by the first visual system.

According to an embodiment, the products are moved forward on the second line at a speed that is at least 1.5 times the feed rate at which the products are supplied on the supply line. Preferably, the products are moved forward on the second line at a speed that is at least 1.6 times the stated feed rate, more preferably at least 1.7 times and even more preferably at least 1.8 times. A higher speed for the second line compared to the feed rate on the supply line is advantageous for the physical separation of the products in the feed direction, because it avoids the risk of a scanned identification code being assigned to the wrong product, for example because two products are placed against or lie on top of each other. This embodiment is particularly advantageous in case the first visual system is mounted above a second line, as previously described. This embodiment can be advantageously combined with previously described embodiments regarding the feed rate of the supply line.

According to a preferred embodiment, the method comprises the additional step of automatically determining dimensions of a product using a second visual system. The second visual system comprises a three-dimensional camera, a three-dimensional laser scanner, a 3D line profiler or other suitable optical means for automatically determining the dimensions of the product. Preferably, the second visual system is a 3D line profiler. The second visual system is mounted above the supply line. Alternatively, the second visual system is mounted above the second line. The application of the label is preferably done after the second visual system.

Automatically determining the dimensions of the product is advantageous for several reasons. The automatically determined dimensions can, for example, be compared with dimensions of the product contained in digital product data that is searched for on the basis of the scanned identification code. If these dimensions deviate significantly, this is an indication that the identification code was probably not scanned correctly and that the product was therefore not correctly identified. The automatically determined dimensions can be used to estimate a weight of the product, for example by determining a volume for the product and multiplying this by an estimated specific weight. This is particularly advantageous if the weight of the product is not included in the digital product data retrieved. This is additionally advantageous because it eliminates the need for scales to determine the weight of the product. For example, the weight of the product is useful for determining transportation costs.

According to a further embodiment, the condition of the product is taken into account when determining the sale price. The condition of the product is determined by comparing the automatically determined dimensions of the product with dimensions of the product included in the digital product data that is searched for on the basis of the scanned identification code. If the automatically determined dimensions deviate significantly from the dimensions of the product included in the digital product data, this is an indication that the product is damaged. If the automatically determined dimensions are almost identical to dimensions of the product included in the digital product data, then this is an indication that the product is in good condition. For example, a frequently read book will have dog cars, which will cause the book to have larger dimensions than when new. For example, a dented box is an indication that the contents of the dented box are damaged or that some of the original contents of the dented box are missing. The automatically determined dimensions deviate significantly from the dimensions of the product included in the digital product data if at least one dimension deviates by at least 5%, preferably at least 10%, more preferably at least 15% and even more preferably at least 20%. The automatically determined dimensions are almost equal to the dimensions of the product included in the digital product data if all dimensions deviate by less than 20%, preferably less than 15%, more preferably less than 10% and even more preferably less than 5%.

When automatically determining the sale price of the product, the sale price can be reduced if the automatically determined dimensions deviate significantly from the dimensions of the product included in the digital product data and/or the sale price can be increased if the automatically determined dimensions are almost equal to the dimensions of the product included in the digital product data. It will be apparent that various rules can be defined for this that are executed automatically.

According to an embodiment, the first visual system is also the second visual system. The first visual system includes a single camera system for both scanning the identification code and automatically determining the dimensions of the product. This is advantageous to limit the number of visual systems required.

According to a preferred embodiment, the label is applied to the label with the aid of a robot. The robot positions the label at a height at least higher than a highest point of the product, after which the robot applies the label to the product. The robot positions the label at least 2 mm above the highest point, preferably at least 3 mm, more preferably at least 4 mm and even more preferably at least 5 mm.

This embodiment is advantageous in combination with a previously described embodiment whereby the dimensions of the product are automatically determined using a second visual system. As a result, the highest point of the product is automatically known.

Positioning the label above the highest point of the product is advantageous to prevent the label from colliding with the product before being applied to the product and therefore being applied in an incorrect position. For example, the label could collide with a dog ear of a book as the book is moved from the supply line or second line to the sorting line, causing the label to be partially or completely applied inside the book rather than on the cover of the book. After the robot has positioned the label in a correct position above the product, the robot can move the label downwards and apply it to the product.

According to a preferred embodiment, the condition of the product is taken into account when determining the sale price. The product is a book. The book includes a spine side. The condition of the product is determined by evaluating the spine side of the book using the second visual system.

This embodiment is advantageous because the spine side of a book is an indication of whether a book is still in good condition. A curved spine or convex spine is an indication that a book has been frequently read and that possibly not all the pages of the book are still attached to the spine.

When automatically determining the sale price of the book, the sale price can be reduced if the spine side is curved or convex and/or the sale price can be increased if the spine side is flat. It will be apparent that various rules can be defined for this that are executed automatically.

According to a further embodiment, a side of the book opposite the spine side is also evaluated. If the side mentioned is curved, this is an indication that not all pages of the book may still be glued or bound to the spine. This indication is even stronger if the spine side of the book is flat. In that case, the sale price of the book can be further reduced. It will be apparent that various rules can be defined for this that are executed automatically.

According to a preferred embodiment, the products are automatically sorted according to genre. The genre is automatically determined based on the digital product data that is searched for on the basis of the scanned identification code. The digital product data includes at least a summary and/or a genre for the product. As in previously described embodiments, the digital product data is searched for in a local database, an online database or an online search engine for identification codes.

The genre of a product is determined according to predetermined rules based on at least one genre in the digital product data. For example, the rules define which genres in the digital product data lead to which genre of the product. The rules may include weights that determine which genre is assigned to the product when different genres for the product are included in the digital product data. Non-limiting examples of genres are fiction, non-fiction, drama, documentary, jazz, rock, classical music, cookbook, hobby, etc.

Alternatively, the genre of a product is determined based on artificial intelligence, where the artificial intelligence takes into account a training set, where the training set includes multiple training examples, and where each training example includes a combination of one or more genres from digital product data and a genre that was ultimately assigned to a product. Artificial intelligence is advantageous if different genres are found for the same product from different sources of digital product data, in order to make an automatic decision about the genre of the product, without there being a predetermined rule for this. It will be apparent to one skilled in the art that the artificial intelligence can be further trained during the execution of the method.

Alternatively, the genre of the product is determined based on artificial intelligence, where the artificial intelligence takes into account a training set, where the training set includes multiple training examples, and where each training example includes a combination of one or more keywords from a summary from digital product data and a genre that was ultimately assigned to a product. Artificial intelligence is particularly advantageous in this case if digital product data does not include any genre. In this case, artificial intelligence can also be used to check whether the genres from the digital product data correspond to a genre determined from the summary from the digital product data. If there is no match, it can be checked, for example, whether at least one genre from the digital product data corresponds to the genre determined from the summary from the digital product data and a genre for the product can be determined based on that genre. Alternatively, if there is no match, a signal can be given that the genre could not be determined, after which a genre is manually assigned to the product. The genre that was given to the product in that case can then be added to the artificial intelligence together with the digital product data as a training example.

It will be apparent that the genre determined for a product can be based on predetermined rules, based on artificial intelligence as previously described or based on a combination of predetermined rules and artificial intelligence.

This embodiment is advantageous because products can be automatically divided according to genre. This is even possible for second-hand products that do not belong to a current or past product range of a retail facility or distribution center.

According to a preferred embodiment, when sorting the products into categories, the products are automatically transported to a category-specific container and stored therein.

The products are sorted on a sorting line. The sorting line includes discharge points. A container is placed at a discharge point. A container at a discharge point is specific to a category. It is a category-specific container. The products are sorted into categories by automatically moving a product belonging to a category over the sorting line to a discharge point, where the category-specific container is located. At the mentioned discharge point, the product is automatically brought from the sorting line into the container. This embodiment is advantageous because it allows quick and automatic sorting of the products into categories. An additional advantage is that the products are immediately ready for further transport.

According to a preferred embodiment, a total weight of products in a category-specific container is calculated on the basis of the automatically determined dimensions of the products. When placing a category-specific container, the calculated total weight of products is zero. For each product, a product weight is estimated based on the automatically determined dimensions, as described previously. When sorting the products into categories, each time a product is placed in a category-specific container, the estimated weight of the said product is added to the total weight of the products in the category-specific container, resulting in a total weight of products in the category-specific container being calculated. After a category-specific container is emptied or replaced with an empty category-specific container, the calculated total weight of products in the category-specific container returns to zero.

This embodiment is advantageous to prevent a category-specific container from being overloaded. This embodiment is additionally advantageous in order to avoid the need to provide scales for each category-specific container to continuously weigh the weight of products in the category-specific container during the sorting of the products.

According to a preferred embodiment, a position on the product for applying the label is automatically determined using the first visual system.

Using the first visual system, an image of the product is created. A position for the label on the product is determined on the image using an image processing algorithm, where the label does not cover any identification code or text on the product. This is advantageous to avoid information on the product being covered by the label.

In a second aspect, the invention concerns a device for sorting, valuation and labeling products provided with an identification code.

According to a preferred embodiment, the device comprises a supply line for supplying products, a first visual system for scanning the identification code of the products, a printer for printing labels and a discharge line.

The supply line includes at least one transport surface for supplying the products according to a feed direction. The at least one transport surface of the supply line is formed by a conveyor belt, roller conveyor or other suitable means for supplying the products. The supply line comprises a drive means for driving the at least one transport surface of the supply line.

The first visual system is mounted above the supply line.

Alternatively, the device comprises a second line and the first visual system is mounted above the second line, wherein the supply line and the second line are placed next to each other for transferring the products from the supply line to the second line. The second line comprises at least one transport surface for taking the products from the supply line to the discharge line. The at least one transport surface of the second line is formed by a conveyor belt, roller conveyor or other suitable means for carrying along the products. The second line comprises a drive means for driving the at least one transport surface of the second line.

The first visual system includes a scanner for scanning barcodes or two-dimensional QR codes. The scanner is preferably a line scan camera.

The printer is preferably placed after the first visual system. The printer is preferably placed next to the supply line or next to any second line and in front of the discharge line.

The discharge line comprises at least a first discharge point for discharging products to a first container and a second discharge point for discharging products to a second container. It will be apparent that the discharge line may include more than two discharge points.

The device comprises a computer system. The computer system includes a central processing unit, a working memory and a permanent memory, such as a hard drive or a solid state disk (SSD). The computer system can be linked to the first visual system. The computer system can be connected to the first visual system via a network connection, a USB connection, a serial connection or another suitable connection. This is advantageous for automatically processing identification codes scanned by the first visual system.

The computer system includes an interface for accessing digital product data. The interface is an interface to a local database, wherein the local database is installed on the computer system or in a Local Area Network (LAN). The local database comprises identification codes of a plurality of products. The local database comprises for each identification code at least the publication date and also a list price and/or a sale price according to at least one online store. Alternatively, the interface is an interface to an online database, wherein the online database is installed in a Wide Area Network (WAN), for example the internet. The online database comprises identification codes of a plurality of products. The online database comprises for each identification code at least the publication date and also a list price and/or a sale price according to at least one online store. Alternatively, the interface is an interface to an online search engine for identification codes, wherein the online search engine for identification codes is hosted on the internet. Alternatively, the interface includes one or more interfaces to a local database, an online database and/or an online search engine for identification codes. The interface is a software and/or a hardware interface.

This device has the advantage, among other things, that it is suitable for automatically scanning the identification code of a product and looking up digital product data of the product. This makes the device suitable for sorting second-hand products that do not belong to a current product range of a retail facility or a distribution center and for example to process these products differently based on age, for example by determining a different sale price based on age.

According to a preferred embodiment, the first visual system comprises a line scan camera. The line scan camera takes images of one line at a time. A line from the line scan camera has a resolution of at least 4096 pixels. The line scan camera has a fixed position relative to the supply line or the second line. The line scan camera has a field of view of at least 300 mm wide transverse to the supply line, preferably at least 350 mm, more preferably at least 400 mm and even more preferably at least 450 mm and even more preferably at least 500 mm. This is sufficiently broad to fully capture products such as books and digital media on the supply line. A line scan camera is particularly suitable for taking images of a linearly moving object, such as the products on the supply line or the second line. The line scan camera makes an image of one line at a time. Because the product is moved forward on the supply line or the second line, an image of a subsequent part of the product is always made. Consecutive images of one line can be merged into one image of the product, after which a sharp image of the entire product is obtained. This is in contrast to a traditional two-dimensional sensor, where motion blur occurs because the product is moved forward on the supply line or the second line. An additional advantage is that the resolution of the entire image of the product in a direction perpendicular to the line of the line scan camera is in principle unlimited. A resolution of 4096 pixels is sufficient to successfully scan an identification code on a product.

According to a preferred embodiment, the device comprises a second visual system for automatically determining the dimensions of a product. The second visual system comprises a three-dimensional camera, a three-dimensional laser scanner, a 3D line profiler or other suitable optical means for automatically determining the dimensions of the product. The computer system can be linked to the second visual system. The computer system can be connected to the second visual system via a network connection, a USB connection, a serial connection or another suitable connection. This is advantageous for automatically determining the dimensions of a product. The second visual system is mounted above the supply line. Alternatively, the second visual system is mounted above the second line. The printer is preferably placed after the second visual system.

According to a further embodiment, the second visual system comprises a 3D line profiler. The 3D line profiler includes a laser for scanning the surface of the product. The 3D line profiler scans the surface of the product on a line at a fixed position relative to the supply line or the second line. The 3D line profiler has a field of view of at least 300 mm wide transverse to the supply line, preferably at least 350 mm, more preferably at least 400 mm and even more preferably at least 450 mm and even more preferably at least 500 mm. This is sufficiently wide to fully scan products such as books and digital media on the supply line. The 3D line profiler scans one line at a time on the surface of the product. Similar to a previously described embodiment about the line scan camera, the entire product is thus scanned, whereby a height profile of the product is obtained. As a result, the 3D line profiler is particularly suitable for automatically determining the dimensions of the product.

According to an embodiment, the first visual system is also the second visual system. The first visual system includes a single camera system for both scanning the identification code and automatically determining the dimensions of the product. This is advantageous to reduce the number of elements of the device.

According to a preferred embodiment, the device comprises a robot for sticking labels to the products. The robot includes a base, a first robotic arm and a second robotic arm. The first robotic arm is rotatably attached to the base with a first end. The first robotic arm is rotatable about a first standing rotation axis through the base. A second end of the first robotic arm is rotatably attached to a first end of the second robotic arm. The second robotic arm is rotatable about a second standing rotation axis at the level of the second end of the first robotic arm and the first end of the second robotic arm. The second robotic arm comprises a gripper at a second end for gripping a label. The gripper can be moved in a direction parallel to the first and second axis of rotation. The robot is positioned near the printer and positioned near the supply line or second line so that the robot can grab a printed label from the printer and apply it to a product before the product is sorted by the sorting line. The robot is preferably placed after the first visual system. The robot is preferably placed after the second visual system. The robot is advantageous for automatically sticking the labels, which enables a high throughput of products in the device. The gripper being movable in a direction parallel to the first and second axis of rotation is advantageous for positioning a label above a highest point of the product and then applying it to the product, so that the label does not collide with the product.

According to a further embodiment, the gripper is a suction nozzle. A suction nozzle is particularly advantageous for gripping self-adhesive labels whereby an adhesive side of the label is not damaged by a gripper. Preferably, the suction nozzle is also a blow nozzle, so that the label, after the gripper has been placed against a product, can be blown onto the product and off the gripper. As a result, the label is firmly attached to the product.

One skilled in the art will appreciate that a method according to the first aspect is preferably performed with a device according to the second aspect and that a device according to the second aspect is preferably configured for performing a method according to the first aspect. Each feature described in this document, both above and below, can therefore relate to any of the three aspects of the present invention.

In a third aspect, the invention concerns a use of a method according to the first aspect and/or a device according to the second aspect for sorting, valuation and labeling of second-hand books and digital media.

This use results in an advantageous sorting, valuation and labeling of second-hand books and digital media, such as CDs and DVDs. Second-hand books and digital media are automatically identified and based on digital product data, a sale price for the second-hand book or digital medium is automatically determined, which is automatically applied to a label on the second-hand book or digital medium. This means that products that are no longer sold new and that are not all in the same condition can be processed automatically.

In what follows, the invention is described by means of a non-limiting figure illustrating the invention, and which is not intended to or should not be construed as limiting the scope of the invention.

DESCRIPTION OF THE FIGURES

FIG. 1 shows a perspective view of a device according to an embodiment of the present invention.

The device comprises a tipping installation (1) for tipping containers with products (5), in this figure books and digital media such as CDs or DVDs. The products (5) are tipped into a hopper (2). An operator (3) places the products (5) on a supply line (4). The supply line (4) is a conveyor belt in this figure. The products (5) are automatically transferred from the supply line (4) to a second line (6). A box (7) is placed above the second line (6). The box (7) contains the first visual system and the second visual system. After the box (7) comprising the first visual system and the second visual system, a printer (8) for printing labels is placed next to the second line (6). After the box (7) and near the printer (8), a robot (9) is placed for grabbing the labels and applying the labels to the products (5). After applying the labels to the products (5), the products (5) are automatically transferred from the second line (6) to the sorting line (10). The sorting line (10) comprises a first conveyor belt (13) and a second conveyor belt (14). The first conveyor belt (13) and the second conveyor belt (14) comprise a transport surface formed by loops. Retractable rollers are placed between the loops. The retractable rollers have a recessed position and a raised position. In the recessed position, the products (5) are transported by the loops of the first conveyor belt (13) of the second line (6) longitudinally, i.e., in the direction of rotation of the loops, to an opposite end of the first conveyor belt (13), where a first discharge point (16) is located. In the raised position, the products (5) are moved sideways from the first conveyor belt (13) by the retractable rollers, for example, depending on a direction of rotation of the retractable rollers towards a second discharge point (11) or a third discharge point (12). In FIG. 1, the first conveyor belt (13) has a total of fourteen discharge points. In a similar manner, a product (5) can be discharged to any discharge point of the first conveyor belt (13). The first conveyor belt (13) has a single position whereby with the retractable rollers in a raised position and a correct direction of rotation, the products (5) are conveyed to a connecting conveyor belt (15). The connecting conveyor belt (15) transports products (5) to the second conveyor belt (14). The second conveyor belt (14) is constructed similarly to the first conveyor belt (13) and has a similar function. The second conveyor belt (14) has twelve discharge points in FIG. 1. It will be apparent that the discharge line (10) can comprise several conveyor belts (13) (14) and several connecting conveyor belts (15).

Figure 2:
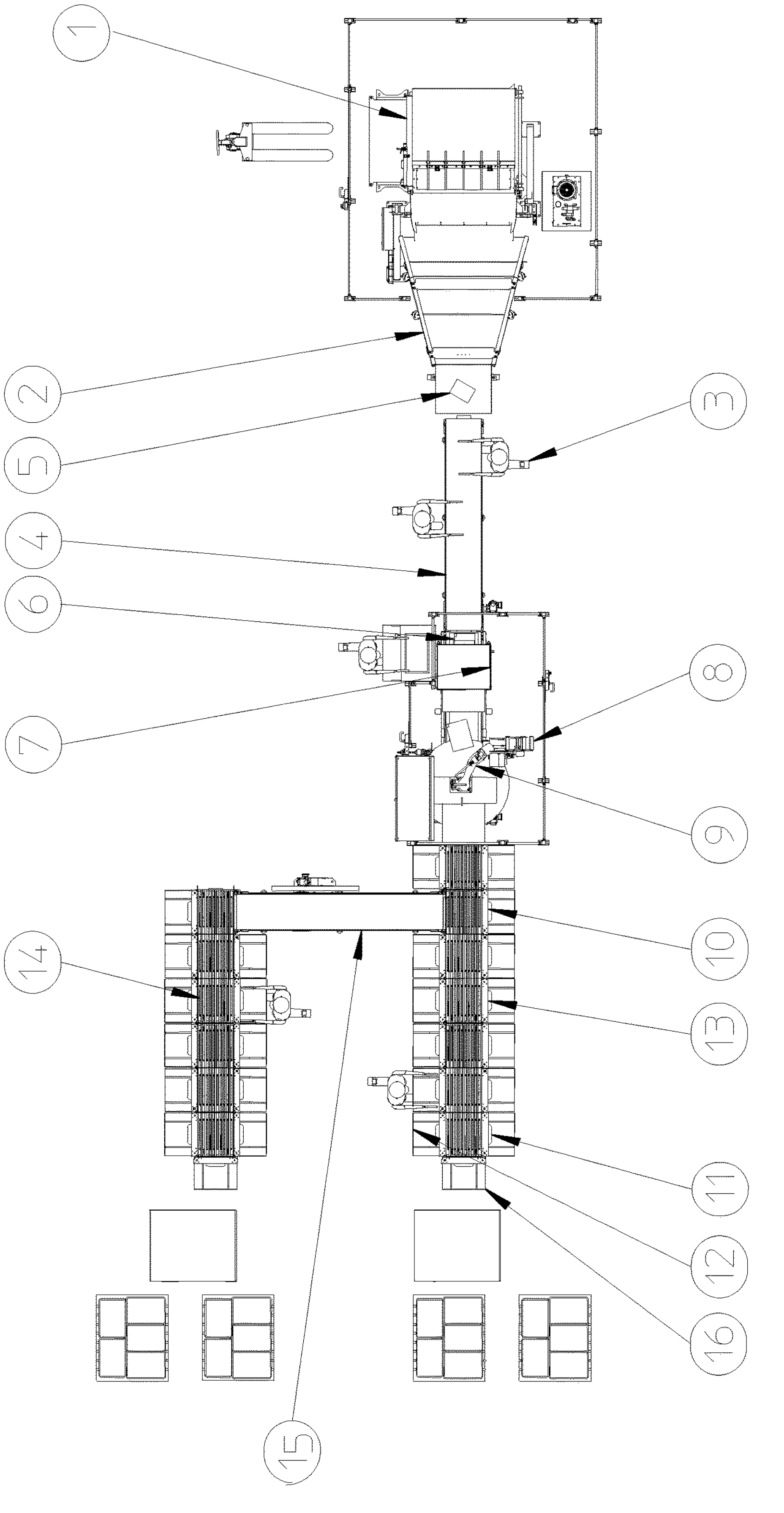
FIG. 2 shows a plan view of a device according to an embodiment of the present invention.

FIG. 2 shows a plan view of a device according to an embodiment of the present invention.

The device corresponds to the device from FIG. 1.

The invention claimed is:

1. Method for sorting, valuation and labeling of products provided with an identification code, comprising the following steps of:

supplying products;

scanning the identification code of the products using a first visual system;

identifying the products based on the scanned identification code;

automatically determining, using a second visual system, dimensions of each of the products;

determining a condition of each product by comparing the automatically determined dimensions with dimensions included in the digital product data;

applying a label to the product using a robot that positions the label at a height at least higher than a highest point of the product and then applies the label to the product; and sorting the products into categories;

wherein when identifying the products on the basis of the scanned identification code, digital product data is retrieved, wherein the digital product data includes at least a publication date and additionally a list price and/or a sale price according to at least one online store, and in that based on the digital product data and the condition, a sale price is automatically determined for each individual product, which is printed on the label.

2. The method according to claim 1, wherein when determining the sale price, a condition of the product is taken into account, wherein the product is a book, wherein the book comprises a spine side, wherein the condition of the product is determined by evaluating the spine side of the book using the second visual system.

3. The method according to claim 1, wherein the products are automatically sorted into categories according to a genre, wherein the genre is automatically determined based on the digital product data, wherein the digital product data includes at least a summary and/or a genre for the product.

4. The method according to claim 1, wherein when sorting the products into categories, the products are automatically transported to a category-specific container and stored therein.

5. The method according to claim 1, wherein a total weight of products in a category-specific container is calculated on the basis of the automatically determined dimensions of the products.

6. The method according to claim 4, wherein a total weight of products in a category-specific container is calculated on the basis of the automatically determined dimensions of the products.

7. The method according to claim 1, wherein a position on the product for applying the label is automatically determined with the aid of the first visual system.

* * * * *